Jan. 14, 1941.    P. V. ELLIOTT    2,228,511
WEIGHING DEVICE
Filed March 2, 1939    2 Sheets-Sheet 1
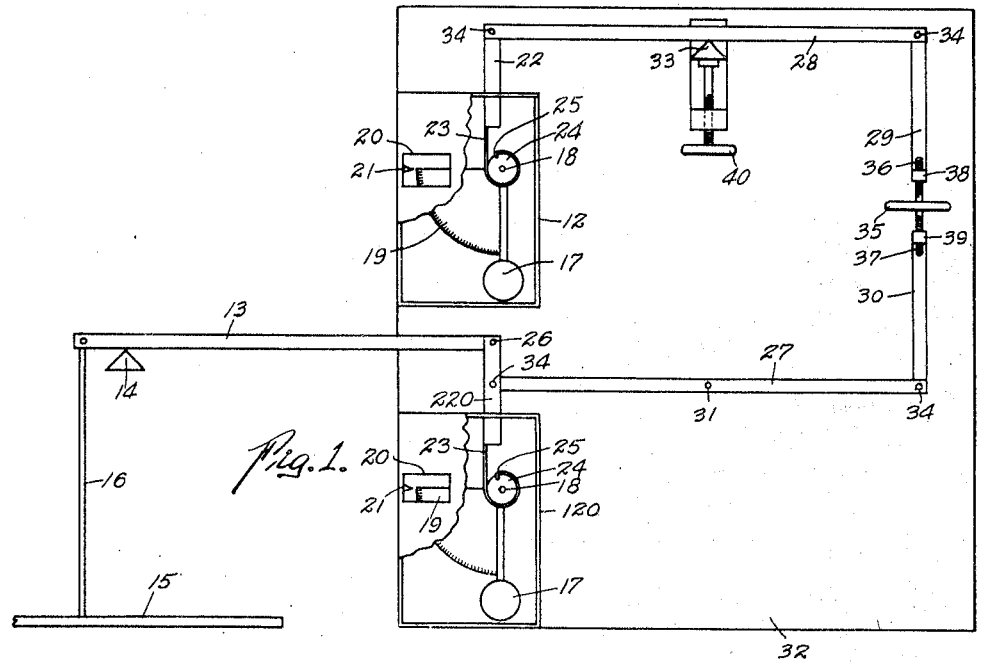
Fig. 1.
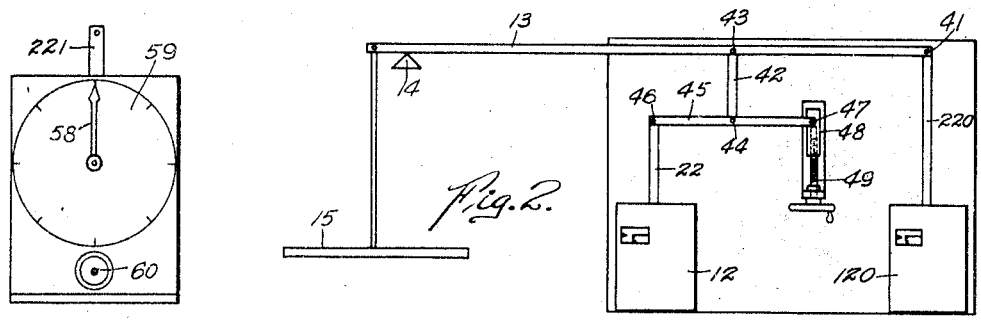
Fig. 4.    Fig. 2.
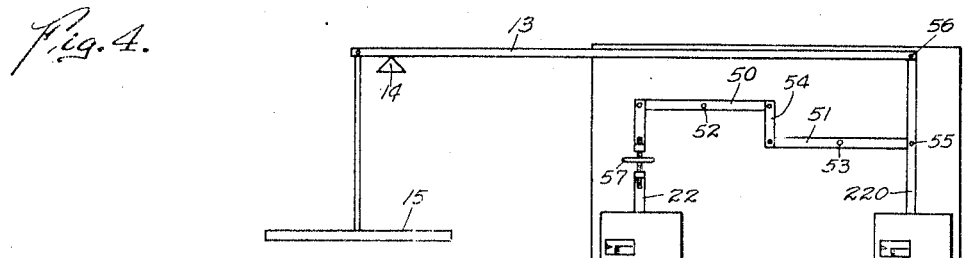
Fig. 3.
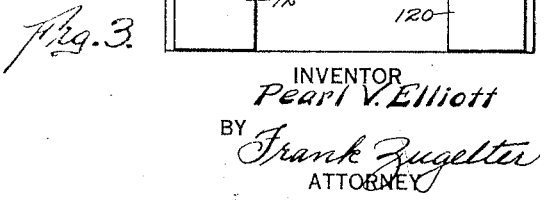
INVENTOR
Pearl V. Elliott
BY Frank Zugelter
ATTORNEY

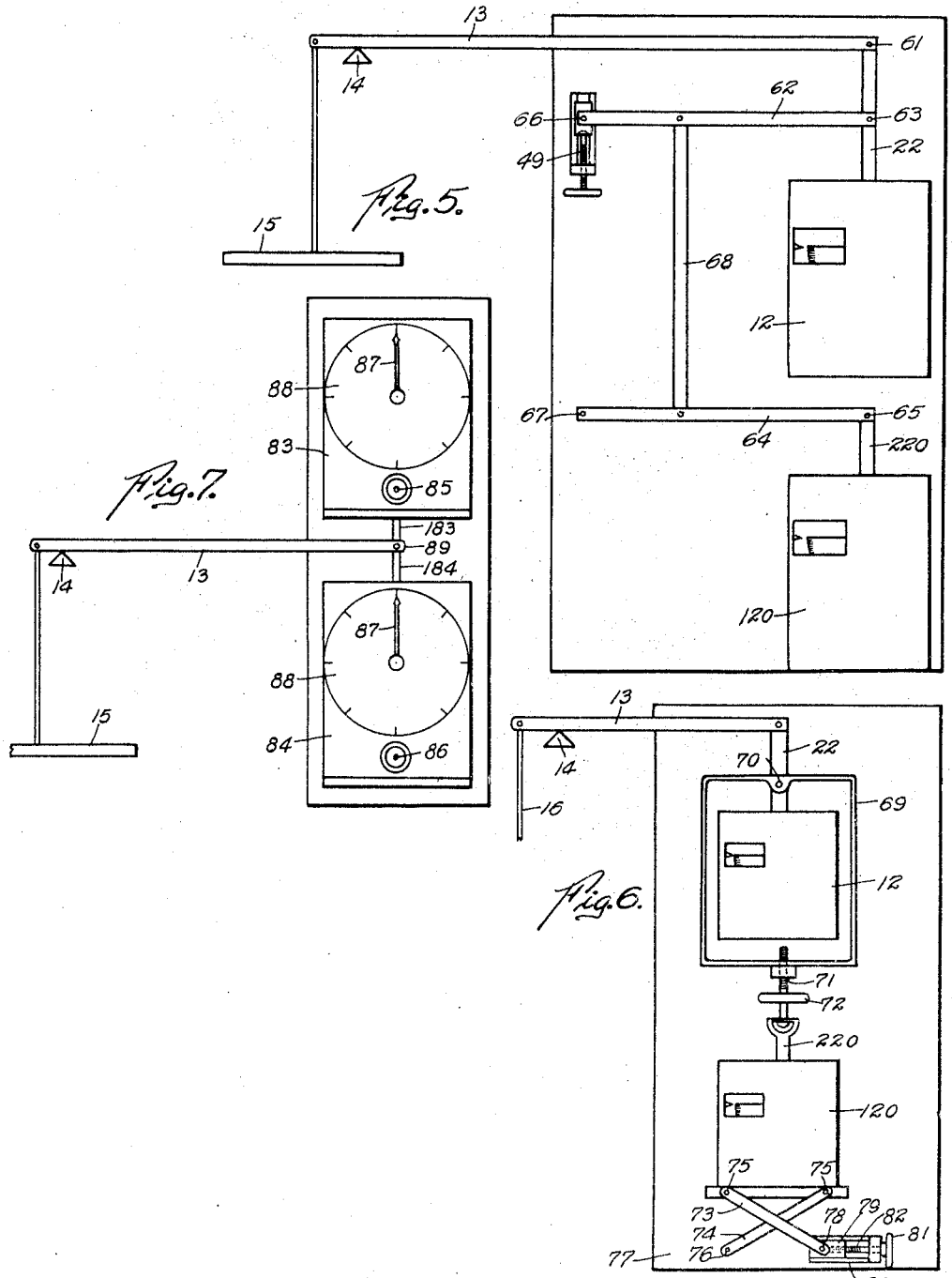

Patented Jan. 14, 1941

2,228,511

UNITED STATES PATENT OFFICE 2,228,511

WEIGHING DEVICE

Pearl V. Elliott, Cincinnati, Ohio

Application March 2, 1939, Serial No. 259,411

7 Claims. (Cl. 265—58)

This invention relates to weighing or measuring devices embodying certain improvements and advantages hereinafter specified. Although the device of the present invention will be hereinafter treated as a weighing device for purposes of explanation and simplicity of disclosure, it is to be understood that the apparatus is applicable to situations wherein the measurement of pressures and forces other than dead weight, are to be determined and indicated. For example, the device may be adapted to the measuring and indicating of fluid pressures, either gas or liquids, just as any ordinary weighing scale could readily be adapted for the same purposes.

An object of the invention is to provide a device of the character stated, which will greatly speed and facilitate an accurate determination of net weight in all instances in which actual tare and gross weights must be taken into account.

Another object of the invention is to accomplish the above advantages with the use of mechanism providing for direct readings, thereby eliminating the need for calculations which ordinarily inject a factor of possible error in the weighing or measuring operation.

A further object of the invention is to eliminate the graduated scale beams and shiftable poises which characterize the ordinary weighing scale, thereby reducing to a minimum the time and effort required for the performance and completion of successive weighing operations.

The foregoing and other objects are attained by the means described herein and disclosed in the accompanying drawings, in which:

Fig. 1 is an elevational view of a simple embodiment of the invention in a weighing scale, using an indicating counterpoise of the pendulum type.

Fig. 2 is an elevational view of a weighing device embodying the invention, in a modified form.

Fig. 3 is a view similar to Fig. 2, showing a modification thereof.

Fig. 4 is an elevational view of a spring operated indicating counterpoise, which may be employed in place of the pendulum type of device, in all forms of the invention.

Fig. 5 is an elevational view of a weighing device embodying the invention, and distinguishing from the preceding views in the arrangement of the indicating counterpoises one above the other.

Fig. 6 is an elevational view of a modification of the combination shown in Fig. 5.

Fig. 7 is an elevational view of a modification in which the indicating counterpoises are in vertical alignment, and work in opposition directly from the balance beam.

In the art of weighing scales it has been common practice to provide in combination with a weighing platform, one or more scale beams suitably calibrated or graduated and adapted to support one or more sliding weights or poises movable by hand along the beams. In the case of wide range high capacity scales, it is not uncommon to find very heavy poises in use. The use of large and heavy shiftable poises has various known disadvantages, chief of which are their liability to damage and wear the beam notches, and their fatiguing effect upon a busy weigher, with a resultant loss of time and quality of service rendered by the weigher. Various other disadvantages inherent in such scales are well known to persons conversant with the art, but need not be detailed herein.

In the effort to obviate some of the disadvantages of the sliding poise type scale, certain improvements have been proposed involving the use of pendulum-operated direct-reading counterpoise units of the general character disclosed conventionally at 12 of Fig. 1. A well known unit of this type is the "weightograph," which has been rather extensively used since its introduction to the art about twenty years ago. However, while the weightograph and similar devices obviated certain of the disadvantages of the shiftable poise, they injected into the weighing operation the necessity for calculations under certain circumstances. Calculations, whether mental or written, usually slowed the weighing operation and often resulted in errors. This was especially true under circumstances requiring a determination of actual tare and net weights, for example, in the case of weighing a container or carrier when empty and weighing it when loaded, then determining the net weight. The procedure in such cases required an expenditure of time in excess of that required with the use of the present invention, and the factor of possible human error was greater than was deemed satisfactory. Both the time factor and the human error factor have been reduced to a practical minimum by means of the invention about to be described.

With reference to Fig. 1 of the accompanying drawings, each of the characters 12 and 120 indicates a pendulum type of counterpoise for a scale or weighing device including a beam 13 fulcrumed at 14. The short end of the beam is connected with a scale platform 15, and it is immaterial whether the platform impose its weight upon the beam end from above or below. In the embodiment illustrated, the platform is pendant from a hanger element 16. In the Fig. 1 disclosure, as well as in all others, the beam 13 need not be graduated or marked in any manner whatsoever, since it is preferred to eliminate the sliding poise that customarily accompanies a marked beam.

Each of the devices 12 and 120 may comprise, in the main, a pendulum 17 of proper weight and accurately determined arcuate swing, hung from a pivotal point 18. A calibrated scale part or dial 19 may be attached to, or otherwise associated with the pendulum, in such a manner as to be movable directly or proportionately with the pendulum. A portion of the dial preferably is visible through a window such as 20 formed in the housing of the device, and as the pendulum is moved about its pivot 18 the dial sweeps past a stationary pointer 21 to indicate amounts of weight marked on the dial 19. The pendulum may be swung incident to the vertical movement of an actuator 22, which carries a flexible ribbon or the like 23 having one of its ends secured to and passing about a drum 24 that rotates or rocks with the pendulum at its pivot suspension point 18. The ribbon or other flexible element 23 may be anchored to the drum or pulley 24 at any point such as 25.

In the commercial form of the device 12 or 120, the dial structure is made more elaborate than as above explained, in order to magnify and illuminate the readings of the dial at the window, but such refinements of the commercial instrument are of no importance to the present invention, and may therefore be ignored. In fact, it is immaterial to the invention whether the device 12 or 120 be operated by means of a pendulum or otherwise, as by a spring or other power storing or generating expedient, so long as such device will indicate weights applied to the scale platform 15. Accordingly, there is shown in Figs. 4 and 7 the use of a direct-reading counterpoise unit which is spring operated, and as will be hereinafter explained, that type of unit may be substituted for the pendulum type of unit in the various modified forms of the invention. It should be understood, accordingly, that any type of counterpoise unit that will operate to afford the results to be hereinafter specified, is contemplated within the scope of the present invention.

In the first form of the invention, as illustrated by Fig. 1, the long end of the beam 13 is pivoted at 26 to the actuator 220 of the unit 120, whereupon it should be evident that a weight placed upon the platform 15 will elevate the actuator 220 for rotating the pendulum and its dial 19 in a clockwise direction of rotation. The movement of said pendulum and dial will be transmitted to the pendulum and dial of unit 12, through the linkage constituted by the levers 27 and 28 and connecting bar 29—30. As disclosed herein, the lever 27 is pivoted upon a stationary pivot 31, which is fixed relative to the panel or support 32, whereas the lever 28 is fulcrumed at the point 33, which is adjustable vertically. The various points 34 are pivots movable with the linkage.

As will be understood by referring to the illustration of Fig. 1, the weight placed upon the platform 15 while both indicators of the units 12 and 120 are synchronized, will show a weight reading upon each indicator representing half of the actual weight placed upon the platform. The purpose of the movable or adjustable fulcrum 33 is to enable, under such circumstances, a setting or adjustment of the unit 12 back to a zero or neutral setting, or in fact to any other setting that may be desired. If by lowering the fulcrum 33, the unit 12 be adjusted to the neutral or zero setting while the weight is in position upon the platform 15, the unit 120 will indicate the full load carried by the platform. The same result is obtainable by means of an adjustment for varying the length of the connecting bar 29—30, assuming fixation of the fulcrum points 31 and 33. By way of example, the effective length of said bar might be varied by means of a hand wheel or the like 35 operative upon right and left hand screws 36 and 37 engaging the stationary nuts 38 and 39 carried by the rod parts 29 and 30. The present invention is not concerned with the specific character of means employed for adjusting the linkages, wherefore it should be distinctly understood that the means operated through the agency of the hand wheels 35 and 40 are but exemplary of a large variety of known adjusting means for the accomplishment of the purpose stated. The adjustments 35 and 40 may be used alternatively, that is, either one or the other might readily be omitted from the combination. Moreover, the combination would be operative if the pivot 31 of lever 27 were made the adjustable pivot or fulcrum, and the variation of effective length referred to in connection with the connecting bar 29—30 could be just as well applied to either of the actuators 22 or 220. To state the purpose broadly, the invention contemplates the intervention of means of any type whereby the load on the far end of the scale beam may be divided, apportioned, or transposed with respect to the counterpoise units 12 and 120.

With the above understanding, it should be evident that the platform 15 might be adapted to support a vehicle or other carrier. By way of example, let it be assumed that an unloaded vehicle is driven onto the platform 15; then by adjusting either one of the hand wheels 35 or 40, it would be possible to set the scale of unit 12 to the zero or neutral position, thereby causing the unit 120 to indicate the full weight of the unloaded vehicle. Assuming that the weight of the unloaded vehicle were indicated upon the unit 120 as 2000#, a notation of that fact could be made, and when the same vehicle returned to the scale platform in a loaded condition, the operator would be required only to adjust one of the hand wheels, to effect an indication of the 2000# tare upon one of the counterpoise units. The other unit thereupon would accurately indicate the net weight of the vehicle contents. Obviously, the weighing operation would be accomplished quickly and without any computation whatever, and the net weight would be readable directly from the scale of the counterpoise unit without the possibility of error. Thus, an accurate account of the net weight is determinable irrespective of the intelligence or lack of intelligence of the operator of the weighing machine.

Fig. 2 discloses a modification of the Fig. 1 combination, which includes the same elements 13, 14, 15, 12 and 120, but in the Fig. 2 form of the invention, the actuator 220 of unit 120 extends from the extreme end of the scale beam 13, whereas the actuator 22 of unit 12 is located intermediate the extreme end 41 and the fulcrum 14. The linkage in this instance may be an upright connecting bar 42 pivoted at 43 intermediate the ends of the beam, said bar having a lower pivot 44 upon a secondary beam 45 intermediate the ends 46 and 47 thereof. At the pivot 47, a slidable block 48 may be furnished for elevating and lowering the level of pivot 47 and beam 45, to adjust the position of the actuator 22 relative to that of the actuator 220. While it is immaterial what type of means is employed for shifting the pivot 47, the conventional rotatable screw arrangement 49 is shown. In the Fig. 2 combination, the positions of the various pivots, and their locations upon the elements 42 and 45, are critical and dependent upon the similarity and dissimilarity of the counterpoise units 12 and 120. The proper moment of the secondary beam 45 and the ratio of leverages can readily be ascertained by persons skilled in the art to which the invention relates.

Fig. 3 discloses a modification of the Fig. 2 combination, wherein the counterpoise units are placed in side-by-side relationship, without resorting to the use of a connecting bar such as 42 of Fig. 2 suspended from an intermediate point of beam 13. In accordance with Fig. 3, a pair of rocking levers 50 and 51 is employed, said levers being fulcrumed at 52 and 53 respectively. The adjacent ends of the levers are connected by a pivotal link 54 capable of transmitting the movement of lever 51 to the lever 50. The outer end of lever 51 may be pivoted as at 55 to the actuator 220, whereby movement of the far end 56 of beam 13 may be transmitted to the actuator 22 of the counterpoise unit 12. If the units 12 and 120 are of like character, the levers 50 and 51 preferably are made identical as to length and moment, so that the pull of the beam may act equally upon both counterpoise units when the units are synchronized. The character 57 indicates conventionally any form of means for throwing the counterpoise units out of synchronism as explained in connection with the Fig. 1 disclosure. The adjusting means 57, or any equivalent thereof, could just as well be interposed between the ends of link 54, or upon the actuator 220 below the pivot 55. Alternatively, a shiftable pivot such as 47 of Fig. 2 could be applied in place of either of the stationary pivots 52 or 53. Reverting back to Fig. 2, it should be understood that an adjusting means of the general character disclosed at 57 of Fig. 3 could be substituted for the shiftable pivot 47, by interposing such an adjusting means in the elements 22, 42, or 220. Wherever possible, however, it is preferable to apply the adjustment to a fulcrum or normally stationary pivot, in order to avoid disturbances in the movement of the beam 13.

Fig. 4 discloses a type of counterpoise unit wherein an indicator hand 58 sweeps a stationary dial 59 as the actuator 221 is moved vertically under the influence of a scale beam. This may be a spring operated counterpoise unit, or it may be operated by a pendulum in the manner of the unit 12. In either case, the counterpoise unit of Fig. 4 may include a manually operable neutralizing means in the form of a shaft 60 to be rotated or rocked for loosening or tightening the coupling between the indicator hand and the spring or pendulum power element of the unit, so that it would be possible to apply the counterpoise unit of Fig. 4 to the various combinations without resorting to the use of fulcrum adjusters or shifters of the general character disclosed at 35, 40, or 49 of Figs. 1 and 2. The general character of the Fig. 4 type of counterpoise unit is exemplified in various kinds of scales, such as bathroom scales which include an adjustment for neutralizing the indicator. It is accordingly deemed unnecessary to detail the inner workings of the Fig. 4 unit.

Figs. 5 and 6 illustrate two forms of the invention wherein the counterpoise units are disposed in vertical alignment, or substantially so. In Fig. 5, the character 22 indicates the actuator for unit 12, and the character 220 indicates the actuator for unit 120. The actuator 22 is pivoted to the scale beam at 61, and at a point remote from said pivot, a lever 62 is pivoted at 63 upon the actuator 22 or upon any part movable therewith. A complementary lever 64 may be located beneath the unit 12, or intermediate the units 12 and 120, to connect with the actuator 22 by means of a pivot 65. The remote ends of levers 62 and 64 are mounted upon the normally stationary pivots 66 and 67, and the opposite ends of a connecting bar 68 may be pivoted to the levers 62 and 64 for connecting them and transmitting movement from one to the other. Although an adjusting means 49 is shown associated with the normally stationary pivot 66, such adjusting means might be located alternatively at the pivot 67. The co-action of the parts in the Fig. 5 combination is substantially the same as that of Fig. 1, it being possible to synchronize and desynchronize the units 12 and 120 for accomplishing the results attained in the explanation of the Fig. 1 disclosure. In the Fig. 5 combination, as well as in the preceding disclosures, the necessary adjustments would be operable by substituting for the adjusting means 49 the adjusting means 35 or 57. Adjusting means of the type disclosed at 35 and 57 of Figs. 1 and 3, would properly be interposed at any of the locations 22, 68, or 220.

In accordance with the Fig. 6 disclosure, the actuator 22 may carry an open frame 69, or any other type of movement transposing element capable of connecting with the actuator 220 of the counterpoise unit 120. In the embodiment illustrated, the transfer element 69 is in the form of a frame having a pivotal connection 70 upon the actuator 22, the lower extremity of the frame being connected with the actuator 220 through the medium of a screw threaded arrangement 71 rendered adjustable by means of a hand wheel or the like 72. The means 71—72 is operative for neutralizing one of the counterpoise units with respect to the other, or for otherwise varying their readings, for purposes explained in connection with Fig. 1. If the connection between the frame 69 and the actuator 220 is made nonadjustable, as it might be, the same results may be obtained by bodily elevating and lowering one of the counterpoise units relatively to the other. In Fig. 6 the counterpoise unit 120 is shown as a bodily shiftable unit. The unit may be bodily shifted by employing any suitable means for the purpose, an example of which is shown comprising a toggle arrangement constituted of a pair of crossed arms 73 and 74 having their upper ends pivoted at 75 to the base of the unit. The lower end of toggle element 74 may be pivoted as at 76 to a panel or other stationary support 77, while the lower pivot 78 of toggle member 73 is rendered shiftable in any suitable manner. To shift the pivot 78, a sliding block 79 may be provided, operating in a guide frame 80 by means of an actuator 81 applied to a screw 82. The adjustment means 82 may be used in the absence of any adjustable connection between the frame 69 and the actuator 220, or conversely, an adjustment such as 71—72 might be employed in the absence of means for bodily elevating and lowering one of the counterpoise units 12 or 120.

With reference now to Fig. 7, the characters 83 and 84 indicate a pair of counterpoise units having self-contained synchronizing and desynchronizing elements operable by means of manual adjusters 85 and 86. The units 83 and 84 may be either spring operated or pendulum operated, and each may include an indicator hand 87 adapted to sweep a calibrated dial 88. It should be noted that the actuator 183 for the unit 83 will advance the indicator hand 87 over the dial upon each upward push of the end 89 of the scale beam 13, whereas the actuator 184 of unit 84 will require a pull in an upward direction, to advance the indicator hand. To this extent, therefore, the counterpoise units 83 and 84 may be different. With the arrangement disclosed however, the adjusting means 85 or 86 may be manipulated to transfer to one counterpoise unit or the other, all or any part of the force exerted by the end 89 of the beam when a weight is applied to the platform 15. It should accordingly be understood that the combination of Fig. 7 may be operated in substantially the manner explained in connection with Fig. 1, the principle of the combination of elements being the same in both cases.

From the foregoing it will be evident that the various disclosures of modified forms of the invention are capable of a great number of variations, so that it would not be feasible to disclose every possible variation conceivable; however, there is to be recognized in all of the disclosures a common principle of operation resulting from kindred coordination of parts, which may be specified as follows.

Each of the various combinations includes, in association with a plurality of direct-reading counterpoise units, a means of transposing all or part of the force of the scale beam selectively to one or the other of the counterpoise units. The action of the selective adjustment is, in effect, that of making one counterpoise unit indicate accurately the position of the pendulum or the dial reading of the other counterpoise unit when the beam is loaded. It may be considered that the adjustment varies the elevation or bias of one counterpoise unit actuator relative to the actuator of the other unit, and this relationship would be in evidence regardless of the number of counterpoise units employed in the system.

While in each illustration the system includes but two counterpoise units installed at an operator's station, it should readily be evident that additional counterpoise units might be installed in the combination should it be considered desirable to apportion the load readings amongst an increased number of such units. Such a construction would not ordinarily be required, however, except in cases of intricate weighing problems which are not ordinarily encountered.

As previously stated herein, the particular type of direct-reading counterpoise units employed in the various combinations, is of small importance to the present invention, and it should accordingly be understood that different types of such units could be employed in the same system, or if desired, one unit could be of a different capacity or sensitivity than the other, in which case the units would be coordinated or synchronized by means of compound or multiplying leverages incorporated into the system. It is to be understood, therefore, that the foregoing and various other modifications and changes in the structural details of the device may be made, within the scope of the appended claims, without departing from the spirit of the invention.

What is claimed is:

1. In a device of the class described, the combination with a beam to be moved upon application thereto of a force to be measured, of means including a plurality of direct-reading counterpoise units arranged one above the other and acted upon simultaneously by the beam to collectively indicate amounts of applied force on the beam, said means comprising an adjustment selectively operative to change the elevation of one counterpoise unit bodily relative to the other for securing separate direct readings of comparative forces applied to the beam.

2. In a device of the class described, the combination with a substantially horizontal beam to be moved upon application thereto of a force to be measured, of a plurality of normally stationary direct-reading counterpoise units arranged one above another, each of said units including an actuator and an indicator, means for transmitting to the actuator of one counterpoise unit the movements of the beam resulting from the application of forces to be measured, a connector for transmitting the movements of the first counterpoise unit actuator to the actuator of the other counterpoise unit, and means for selectively lengthening and shortening said connector.

3. In a device of the class described, the combination with a beam to be moved upon application thereto of a force to be measured, of a plurality of normally stationary direct-reading counterpoise units arranged in proximity one above another, each of said units including an actuator and an indicator, means for transmitting to the actuator of one counterpoise unit the movements of the beam resulting from the application of forces to be measured, a connecting means adapted to transpose a portion of the beam movement force to the actuator of another of the counterpoise units whereby to relieve said one counterpoise unit of a portion of said force, said connecting means including a selectively adjustable element to vary the length of said connecting means.

4. In a device of the class described, the combination with a beam and means for moving the beam upon application thereto of a force to be measured, of a plurality of direct-reading counterpoise units each including an actuator and an indicator, means connecting the actuator of one counterpoise unit to the beam for registering beam movements upon the indicator of said one counterpoise unit, a beam movement translating means for imposing beam movements upon the actuator of a second counterpoise unit, said translating means including a rigid connecting link variable as to length for apportioning the extent of beam movement selectively to the actuators of the counterpoise units, thereby to bias the counterpoise unit indicators relatively, for the purposes described.

5. In a device of the class described, the combination with a beam and means for moving the beam upon application thereto of a force to be measured, of a plurality of direct-reading counterpoise units each including an actuator and an indicator, means connecting the actuator of one counterpoise unit to the beam for registering beam movements upon the indicator of said one counterpoise unit, a beam movement translating means for imposing beam movements upon the actuator of a second counterpoise unit, said translating means including a system of pivoted levers arranged to apportion beam movements and their accompanying forces between the actuators of the counterpoise units, and means for varying the apportionment of movements and forces, including a device for varying the elevation of a lever pivot.

6. In a device of the class described, the combination with a fulcrum and a substantially horizontal beam adapted for movement about the fulcrum upon application of a force to the beam, of a stationary support, and a plurality of direct-reading counterpoise units fixed relative to the support, each including an upright actuator and an indicator, means for transmitting to the actuator of one counterpoise unit the movements of the beam resulting from the application thereto of forces to be measured, and a beam movement translating means operative upon the other counterpoise unit, including a pivot selectively shiftable relative to the support in a direction for changing the elevation of said pivot, and a lever mounted for rocking movement upon the pivot, said lever including means for moving it with the beam and with the actuator of said other counterpoise unit.

7. In a device of the class described, the combination with a beam to be moved upon application thereto of a force to be measured, of a plurality of direct-reading counterpoise units arranged in proximity to one another, each of said units including an actuator and an indicator, means for transmitting to the actuator of one counterpoise unit the movements of the beam resulting from the application of forces to be measured, a connecting means adapted to transpose a portion of the beam movement force to the actuator of another of the counterpoise units whereby to relieve said one counterpoise unit of a portion of said force, said connecting means including a selectively adjustable rigid element to vary the length of said connecting means.

PEARL V. ELLIOTT.

CERTIFICATE OF CORRECTION.

Patent No. 2,228,511.                              January 14, 1941.

PEARL V. ELLIOTT.

It is hereby certified that error appears in the above numbered patent requiring correction as follows: In the grant, line 13, for "Pearl V. Elliott, her heirs" read --Pearl V. Elliott, his heirs--; and that the said Letters Patent should be read with this correction therein that the same may conform to the record of the case in the Patent Office.

Signed and sealed this 4th day of March, A. D. 1941.

(Seal)                                         Henry Van Arsdale,
                                               Acting Commissioner of Patents.